United States Patent [19]
Pottinger et al.

[11] Patent Number: 5,347,842
[45] Date of Patent: Sep. 20, 1994

[54] CALIBRATION APPARATUS FOR TIRE TEST SYSTEM

[75] Inventors: Marion G. Pottinger, Akron; David M. Batdorff, Wadsworth, both of Ohio

[73] Assignee: F & M Company Limited Partnership, Akron, Ohio

[21] Appl. No.: 138,836

[22] Filed: Oct. 19, 1993

[51] Int. Cl.$^5$ .................. G01L 25/00; G01M 17/02
[52] U.S. Cl. ................................. 73/1 R; 73/146
[58] Field of Search ............. 73/1 R, 146, 8; 33/203, 33/203.12, 203.13, 203.18, 203.19

[56] References Cited

U.S. PATENT DOCUMENTS 3,640,132  2/1972  Miles et al. ..................... 73/146

Primary Examiner—Donald Woodiel
Attorney, Agent, or Firm—Renner, Kenner, Greive, Bobak, Taylor & Weber

[57] ABSTRACT

Calibration apparatus (40) for a tire testing machine (11) having an A-shaped framework (13) formed by diverging trunions (25, 26) with a spindle (37) having a face seating a wheel for mounting a test tire (T) movably supported between the trunions including, a pair of beam mounting assemblies (42, 42) affixed in spaced relation on the A-shaped framework, a cross beam (75) supported by the pair of beam mounting assemblies, a calibration bar positioning assembly (85) on the cross beam supporting a calibration bar (120) in spaced relation to the face of the spindle, an angle adjusting platform (95) on the calibration bar positioning assembly for selectively angularly orienting the calibration bar relative to the cross beam, an indicator mounting rod (127) extending from the spindle in a direction paralleling the face of the spindle, a dial indicator (130) extending from the indicator mounting rod for engaging the calibration bar at spaced locations upon rotation of the spindle through approximately 180° to establish parallelism of the face of the spindle and the calibration bar at selected angular settings of the spindle and the calibration bar.

15 Claims, 5 Drawing Sheets

CALIBRATION APPARATUS FOR TIRE TEST SYSTEM

TECHNICAL FIELD

The present invention relates generally to an improvement in tire test systems which are designed to measure the forces tires generate when interacting with a roadway. More particularly, the present invention relates to apparatus for calibrating a tire test system to assure accuracy in the positioning of a tire while it is tested in a force and moment sensing machine. More specifically, the present invention relates to apparatus for calibrating a tire test system to precisely provide location and reproducibility of zero slip angle as a component of the force and moment measurements on tires which are sensed under varying orientations and loading in interacting with a roadway.

BACKGROUND ART

Pneumatic tires for vehicles are a fundamental component which generate forces that control vehicle motion. It has been recognized for some time that valuable information can be derived as to tire performance and design with the capability of measuring the forces and moments exerted by a road surface on a tire as steering, cambering, and braking take place. It is necessary that these forces and moments be measured rather than calculated because current computational mechanics technology is inadequate for the purpose of computing the forces and moments exerted by the road on the tire with the accuracy required for engineering purposes.

Early indoor systems for making tire force and moment measurement employed a flat roadway surface in the form of a planar bed or plank or employed round, convex, simulated roadways which were engaged by a tire on an external road wheel. Later, internal road wheel machines were employed wherein a tire engaged the internal surface of a round, concave, simulated roadway. All of these systems had significant limitations, such as the fact that the forces developed on a round or curved surface engaged by a tire are not equivalent to those which are developed on a flat surface like an actual road surface.

In order to achieve the accuracy advantages which can be realized only by a flat road bed, more recent systems have employed a continuous flat-surface machine consisting of an endless belt engaging two spaced rollers to provide a flat test surface there between. Improvements in machines of this type with sophisticated controls have reached a point that it is possible to monitor vehicular behavior during loss of control and in the simulation of anti-lock brake and traction control systems. Obtaining the requisite data for this type of analysis requires simultaneous and interactive control of slip angle, slip angle rate, inclination angle normal force, roadway velocity, spindle speed, and spindle speed rate. A tire test system known as the "Flat Track II" manufactured by MTS Systems Corp. incorporates the basic capabilities for obtaining this data, such that it is possible to make a meaningful analysis of the performance of a test tire under controlled operating conditions.

While the "Flat Track II" provides a high degree of accuracy with respect to most types of settings and test results, a problem has been observed with respect to residual pull testing. Residual pull testing requires a highly accurate determination of zero slip angle. In addition, the repeatability of accurate determination of zero slip angle is necessary for comparing results of long-term experiments, which may be conducted over a substantial period of time. In such instances, it is required that a highly accurate and reproducible determination of zero slip angle must be possible, despite the necessity of recalibration of zero slip angle, which may be required during the conduct of certain types of tests, because of electronic problems in the system, or due to other variables which necessitate recalibration of slip angle.

Zero slip angle contemplates the condition where the tire being tested, the wheel, and the face of the spindle on which the wheel is mounted are all precisely aligned with the direction of travel of the stainless steel belt serving as the roadway. The calibration fixture supplied with the "Fast Track 2" machine endeavors to align the spindle face with a calibration bar which is attached to the stainless steel belt and which in turn is aligned with the movement of a point on the belt as it is displaced a short distance between the supporting drums. Because of the attachment of the calibration fixture to the lateral edges of the belt, variations in the belt construction, and perhaps other factors, slip angle recalibration can be effected only to an accuracy of approximately plus or minus 0.025°. It has been found that an accuracy of this magnitude is inadequate for meaningful calculation in residual pull tests.

In addition to the lack of sufficient accuracy for some tests, recalibration employing the standard fixture attached to the belt is a relatively slow and meticulous operation to effect attachment of the fixture supporting structure to the belt and to otherwise complete the calibration operation before subsequent removal of the fixture mounting structure. Thus, the time and inconvenience of recalibration employing the standard fixture and the lack of sufficient accuracy have impeded successful calculations during residual pull testing and other operations dependent upon highly accurate and reproducible slip angle calibration.

DISCLOSURE OF THE INVENTION

Therefore an object of the present invention is to provide calibration apparatus for the "Flat Track II" test machine which permits reliable residual pull testing measurements as part of the testing of tires. Another object of the present invention is to provide such calibration apparatus which can provide slip angle alignment to an accuracy sufficient for carrying out residual pull testing. Still another object of the present invention is to provide such calibration apparatus which is capable of aligning slip angle to an accuracy of plus or minus 0.002°. Yet another object of the present invention is to provide such calibration apparatus which can provide reproducible or repeat slip angle calibration whenever desired or required to an accuracy of approximately plus or minus 0.002°.

Another object of the present invention is to provide calibration apparatus for a tire-testing machine which does not attach to the endless belt representing the road surface but which is attached to the frame of the machine. A further object of the present invention is to provide such calibration apparatus having mounting plates permanently affixed to the frame of the machine to initially adjust position and support a beam carrying a calibration bar and to thereafter precisely and accurately reposition the beam at any time it is desired to verify or recalibrate slip angle. Yet another object of the present invention is to provide such calibration apparatus which can be quickly and easily positioned to carry out the calibration procedure without the necessity of dismantling any components of the machine.

Another object of the present invention is to provide calibration apparatus for a tire testing machine which has an angle setting mechanism for selectively positioning a calibration bar at varying slip angles through a range of from plus 30° to minus 30°, at 10° or other selected intervals there between. Still another object of the present invention is to provide such calibration apparatus for a tire-testing machine which employs a dial indicator which can be easily operated and read to determine the requisite parallelism between the spindle carrying the dial indicator and the precisely positioned calibration bar of the calibration apparatus. Still a further object of the present invention is to provide such calibration apparatus which can be readily fabricated to the required precision to achieve the requisite accuracy at reasonable cost. Yet a further object of the invention is to provide such calibration apparatus which is sufficiently strong and durable to accommodate repeated usage in a testing environment while maintaining the necessary accuracy.

At least one or more of the foregoing objects, together with the advantages thereof over known apparatus for effecting slip angle calibration which shall become apparent from the specification which follows, are accomplished by the invention as hereinafter described and claimed.

In general the present invention contemplates calibration apparatus for a tire testing machine having an A-shaped framework formed by diverging trunions with a spindle having a face seating a wheel for mounting a test tire movably supported between the trunions including, a pair of beam mounting assemblies affixed in spaced relation on the A-shaped framework, a cross beam supported by the pair of beam mounting assemblies, a calibration bar positioning assembly on the cross beam supporting a calibration bar in spaced relation to the face of the spindle, an angle adjusting platform on the calibration bar positioning assembly for selectively angularly orienting the calibration bar relative to the cross beam, an indicator mounting rod extending from the spindle in a direction paralleling the face of the spindle, a dial indicator extending from the indicator mounting rod for engaging the calibration bar at spaced locations upon rotation of the spindle through approximately 180° to establish parallelism of the face of the spindle and the calibration bar at selected angular settings of the spindle and the calibration bar.

PREFERRED EMBODIMENT FOR CARRYING OUT THE INVENTION

Figure 1:
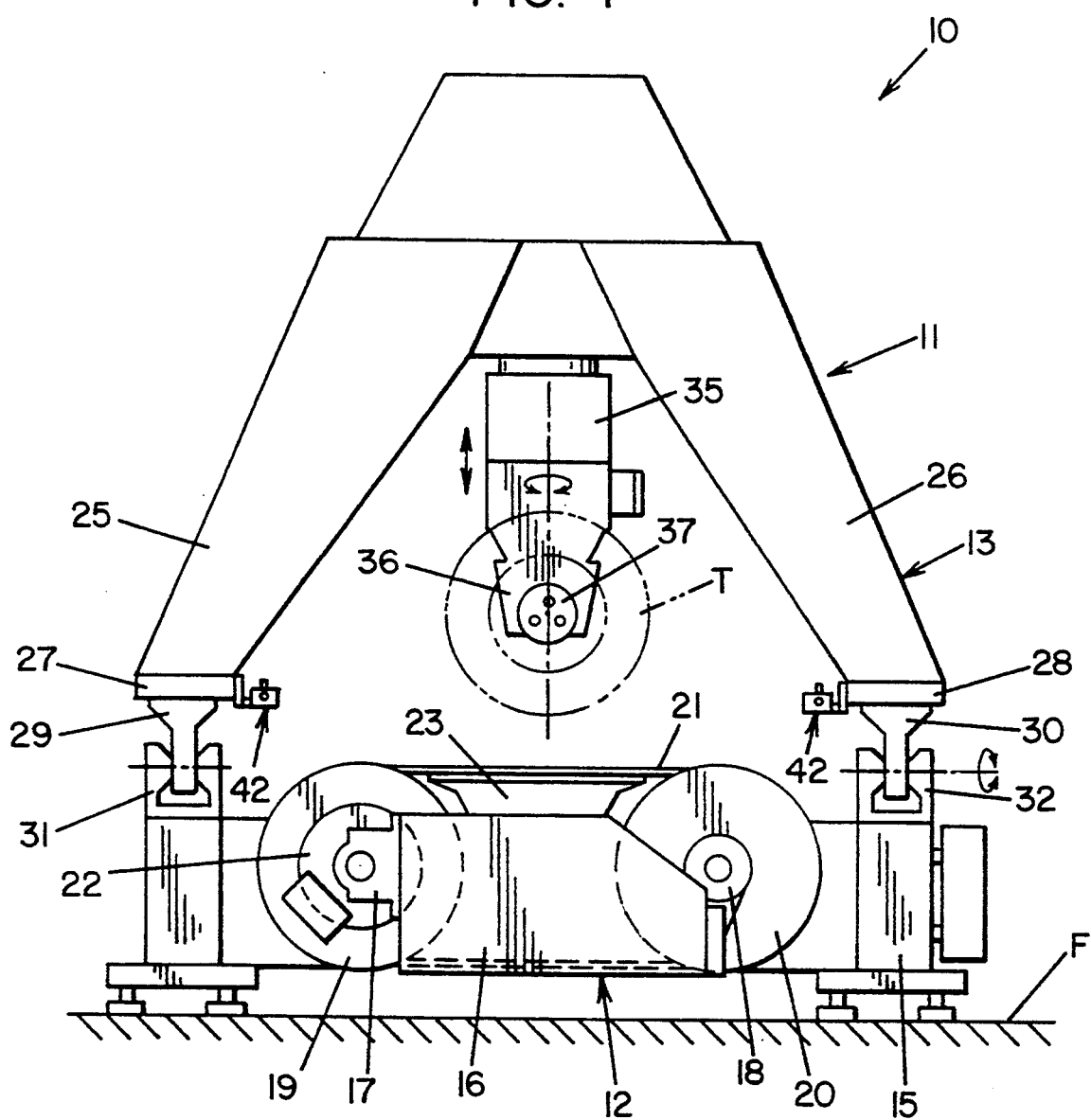
FIG. 1 is a fragmentary, partially schematic, front-elevational view of the machine assembly of a tire test system on which calibration apparatus according to the concepts of the present invention may be installed.

A tire test system to which the concepts of the present invention are applicable is the MTS Model 868 Flat-Trac ® which is a state-of-the-art system well known to persons skilled in the art. The tire test system is shown in part schematically in FIG. 1 where it is generally indicated by the numeral 10. In particular, the portion of the tire test system 10 depicted is the machine assembly, generally indicated by the numeral 11, which applies the physical test inputs to a test tire based upon inputs from a control system (not shown) that specifies tests being performed and otherwise controls the machine assembly.

The machine assembly 11 has two interacting subsystems in the form of a roadway assembly, generally indicated by the numeral 12, and an upstanding framework assembly, generally indicated by the numeral 13. A C-frame 15 cantilever suspends the other elements of roadway assembly 12 above a floor F. The C-frame 15 mounts a roadway unit frame 16 of the roadway assembly 12. A pair of pillow blocks 17 and 18 attached to roadway unit frame 16 mount a drive drum 19 and an idler drum 20.

Power is supplied to the drive drum 19 by a drive motor (not shown). The simulated roadway surface is a belt 21 mounted on the drums 19, 20. The belt 21 is a continuous surface, preferably made of stainless steel. An arrangement of hydraulic actuators (not shown) is employed in conjunction with the idler drum 20 to control the tension in belt 21 and to steer the belt 21 to maintain it centered laterally of the drums 19, 20. The drums 19, 20 are slowed or stopped, as necessary for operational or safety purposes, by a hydraulic disk caliper brake mechanism 22 associated with the drive drum 19.

A water bearing 23 is mounted on the roadway unit frame 16 to support the belt 21 over a substantial portion of the distance between drive drum 19 and idler drum 20. The upper surface of the water bearing 23 is substantially tangential to the uppermost point of drums 19, 20, as viewed in FIG. 1, to underlie belt 21 and effect cooling and lubrication under the extreme loading conditions to which the belt 21 is subjected during testing operations.

The framework assembly 13 is in the nature of a movable A-frame consisting of a pair of downwardly diverging trunions 25 and 26 having trunion bases 27 and 28, respectively. The trunion bases 27, 28 are attached to movable brackets 29 and 30, respectively, which pivot relative to fixed brackets 31 and 32, respectively. The fixed brackets 31 and 32 are affixed proximate the extremities of the C-frame 15. Therefore, trunions 25 and 26 pivot relative to fixed brackets 31 and 32 to produce selected camber angles to be applied by machine assembly 11 to a test tire T.

The test tire T is carried on an arm 35 which extends downwardly from the apex of trunions 25 and 26. The arm 35 has a spindle 37 to which the tire T is mounted for the testing operations. The spindle 37 is housed in a transducer 36 on the arm 35. The arm 35 and thus spindle 37 are vertically movable by actuators (not shown) to extend and retract the arm 35 relative to the trunions 25 and 26 for positioning and radial force loading and rotationally movable by actuators (not shown) for setting a desired direction of wheel heading.

Figure 2:
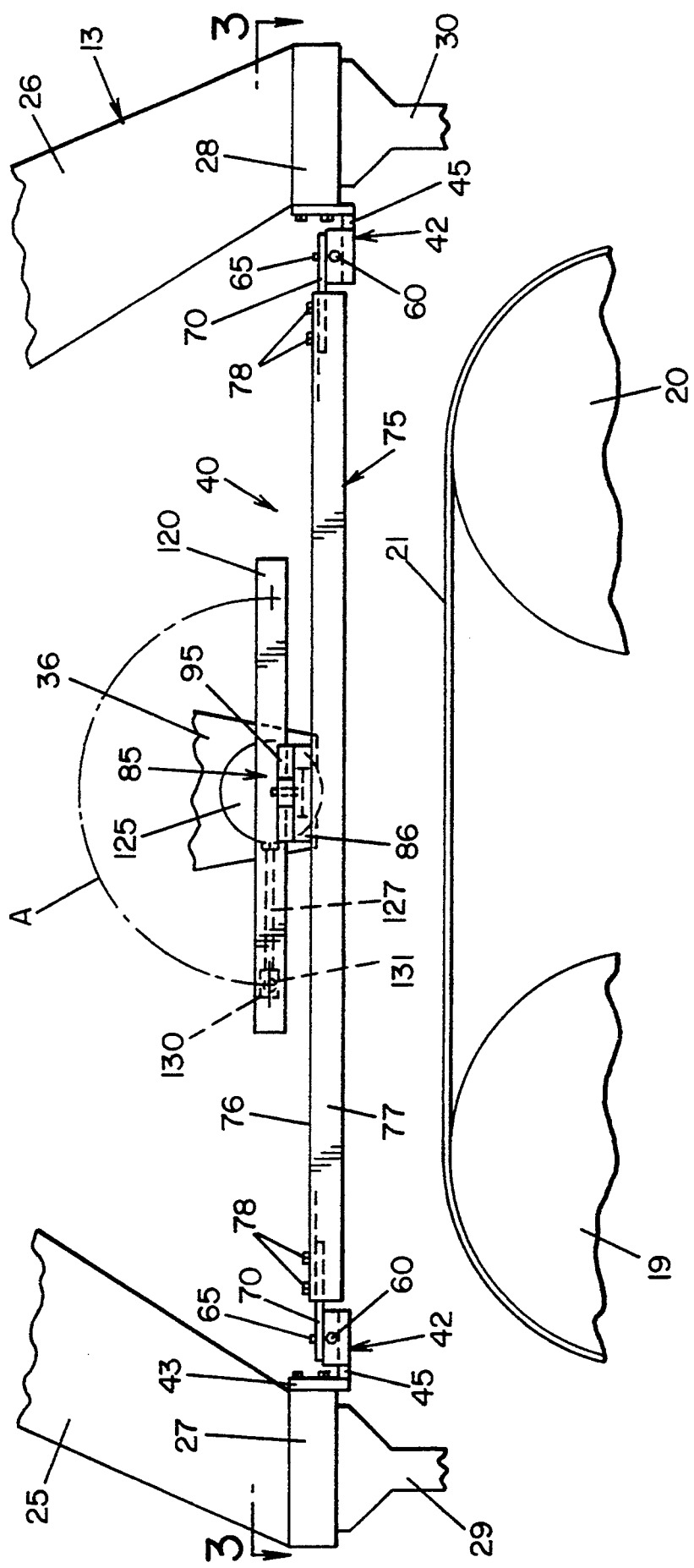
FIG. 2 is an enlarged, front-elevational view of the calibration apparatus positioned in operative relationship to fragmentary portions of the machine assembly of a tire test system.
Figure 3:
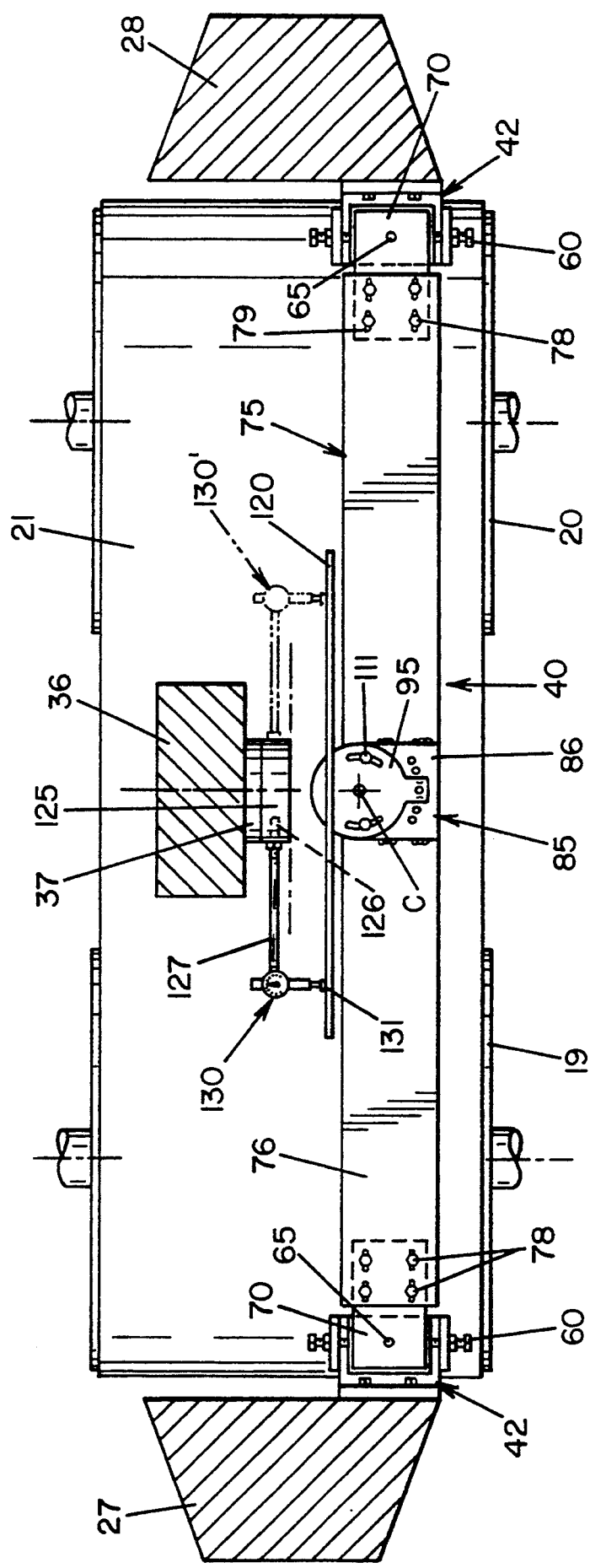
FIG. 3 is a top plan view of the calibration apparatus taken substantially along the line 3—3 of FIG. 2 and depicted in relation to fragmentary portions of the machine assembly of a tire test system.

A calibration fixture according to the concepts of the present invention is generally indicated by the numeral 40 in FIGS. 2 and 3 of the drawings. The calibration fixture 40 is there shown in operative relationship to the machine assembly 11. As seen, the calibration fixture 40 has a pair of beam mounting assemblies, generally indicated by the numeral 42, which are attached to the framework assembly 13 of the machine assembly 11. A preferred location for attaching the beam mounting assemblies 42 to framework assembly 13 is the inwardly directed surfaces of the trunion bases 27 and 28 located at the bottom of the trunions 25 and 26, respectively.

Figure 6:
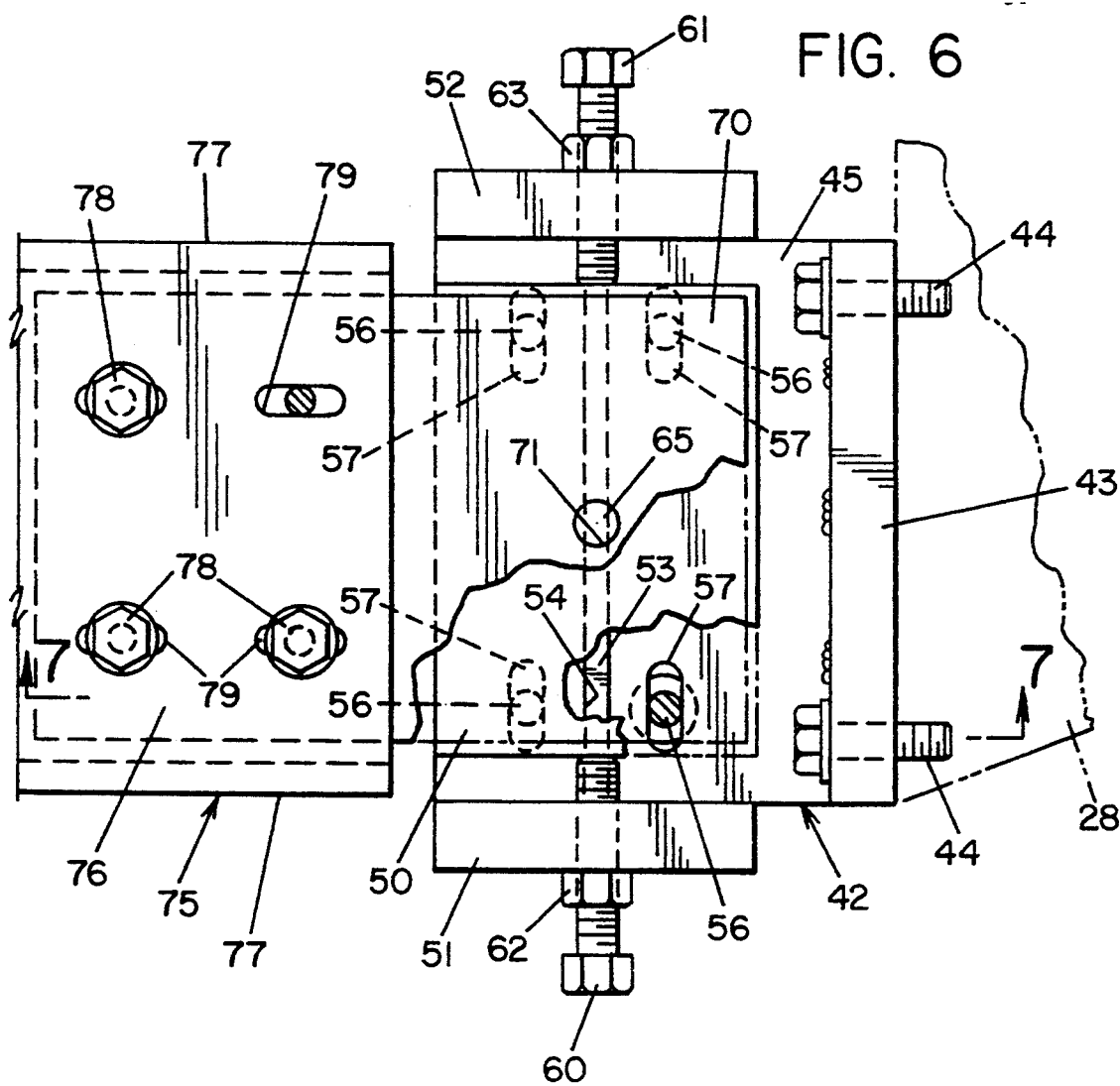
FIG. 6 is an enlarged, fragmentary view as viewed in FIG. 3 of the beam mounting assembly interconnecting the channel beam of the calibration apparatus and the machine assembly.
Figure 7:
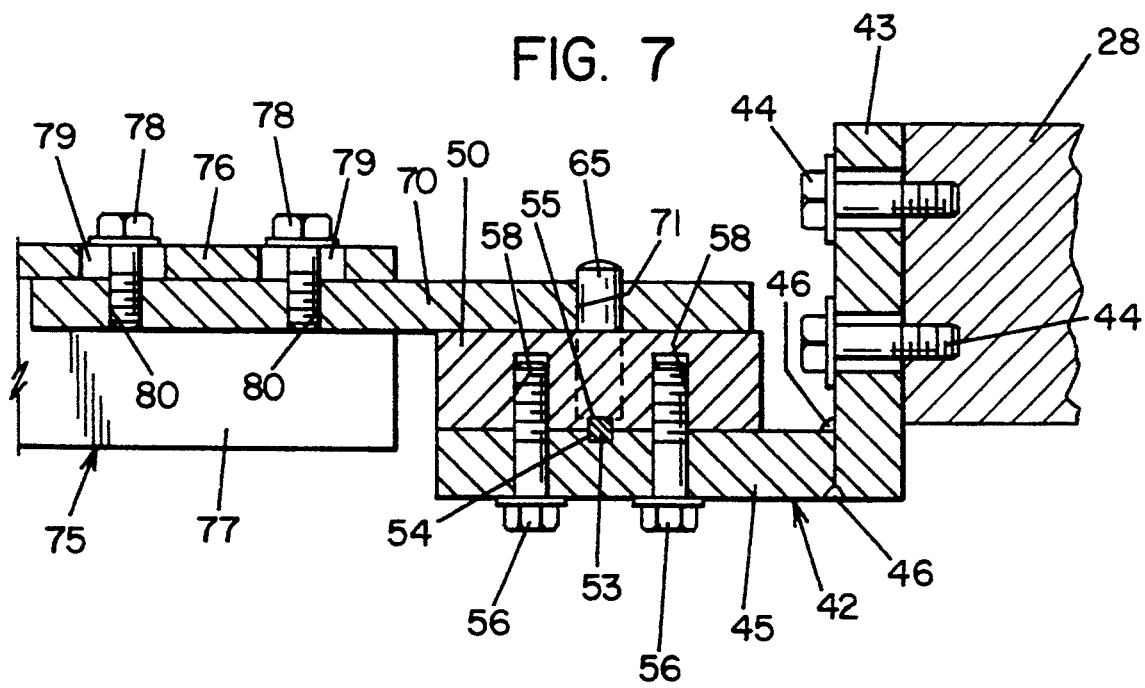
FIG. 7 is a cross-sectional view through the beam mounting assembly of the calibration apparatus taken substantially along the line 7—7 of FIG. 6.

Referring now to FIGS. 6 and 7, in addition to FIGS. 2 and 3, it can be seen that beam mounting assemblies 42 include a vertical plate 43 which overlies the trunion bases 27, 28 and are permanently affixed thereto as by fasteners 44, such as machine screws. Projecting substantially horizontally outwardly from the vertical plates 43 are horizontal plates 45. The horizontal plates 45 are rigidly attached to the vertical plates 43 as by welds 46 (see FIG. 7).

The horizontal plate 45 of beam mounting assemblies 42 supports an alignment block 50. The alignment block 50 is movable laterally on the horizontal plate 45 between a pair of side plates 51 and 52 which are attached to horizontal plate 45. Directed lateral motion of the alignment block 50 may be assured by a key 53 which engages mating keyways 54 and 55 in the horizontal plate 45 and the alignment block 50, respectively. The alignment block 50 is retained relative to horizontal plate 45 by a plurality of machine screws 56 which extend through elongate lateral flats 57 in the horizontal plate 45 and are threaded into tap bores 58 in the alignment block 50.

The lateral positioning of alignment block 50 relative to the horizontal plate 45 is effected by two opposed machine screws 60 and 61 which are threaded through the side plates 51 and 52, respectively (see FIGS. 3 and 6). The machine screws 60, 61 are movable relative to the side plates 51, 52 for selective engagement with lateral sides of alignment block 50. Once the alignment block 50 is in the desired position with machine screws 60, 61 engaging the lateral sides thereof, the positioning may be indefinitely retained by moving the nuts 62 and 63 threaded onto the machine screws 60, 61 into locking engagement with the side plates 51 and 52, respectively. The alignment block 50 is provided preferably substantially centrally thereof with an upstanding alignment pin 65.

The beam mounting assemblies 42 also include beam end supports 70 which are plate-like members that overlie the alignment blocks 50 and which have bores 71 which are adapted to precisely receive the pins 65 attached to and projecting upwardly from the alignment blocks 50.

The beam end supports 70 interconnect the beam mounting assemblies 42 with the cross beam 75 which extends generally between the trunion bases 27 and 28. The cross beam 75 may, as seen in FIGS. 2, 3, 6, and 7, be a conventional channel beam having a web 76 and a pair of side flanges 77 extending from said web 76. The beam end supports 70 underlie an extent of the web 76 of the cross beam 75. A plurality of machine screws extend through longitudinal slots 79 in the web 76 of cross beam 75 and are threaded into tapped bores 80 in the beam end supports 70. It will thus be appreciated that the position of the cross beam 75 longitudinally relative to the beam end supports 70 may be suitably adjusted with the machine screws 78 loosened and when appropriately positioned so maintained by tightening the machine screws 78. It will be appreciated that once properly positioned, the cross beam 75, with the beam end supports 70 attached thereto, may be positioned on and removed from the beam mounting assemblies 42 by merely aligning the bores 71 in beam end supports 70 with the alignment pins 65 of the alignment blocks 50. Thus, rapid, precise position of the cross beam 75 is thereby possible.

Located substantially medially of the cross beam 75 is a calibration bar positioning assembly, generally indicated by the numeral 85. As seen by reference to FIGS. 2-5, inclusive, the calibration bar positioning assembly 85 has a fixed base 86 which is attached to the web 76 of cross beam 75, as by a plurality of welds 87. The fixed base 86 may be of a generally rectangular configuration, with one substantially linear extremity 88 and a semicircular extremity 89. Proximate the linear extremity 88, there are a plurality of spaced bores 90 positioned on an arc which may be located at the center C of the semicircular extremity 89. Each of the bores 90 is provided with a precision hardened bushing 91 for a purpose to be described hereinafter. As shown for exemplary purposes, the bushings 91 are spaced at 10° angular increments and have associated indicating indicia 92 which represent 10°, 20°, and 30° angular increments to either side of a 0° position. The fixed base 86 has a central bore 93 which, as shown, is centered at the center C of the semicircular extremity 89. The bore 93 carries a hardened steel bushing 94 for a purpose to be described hereinafter.

Figure 4:
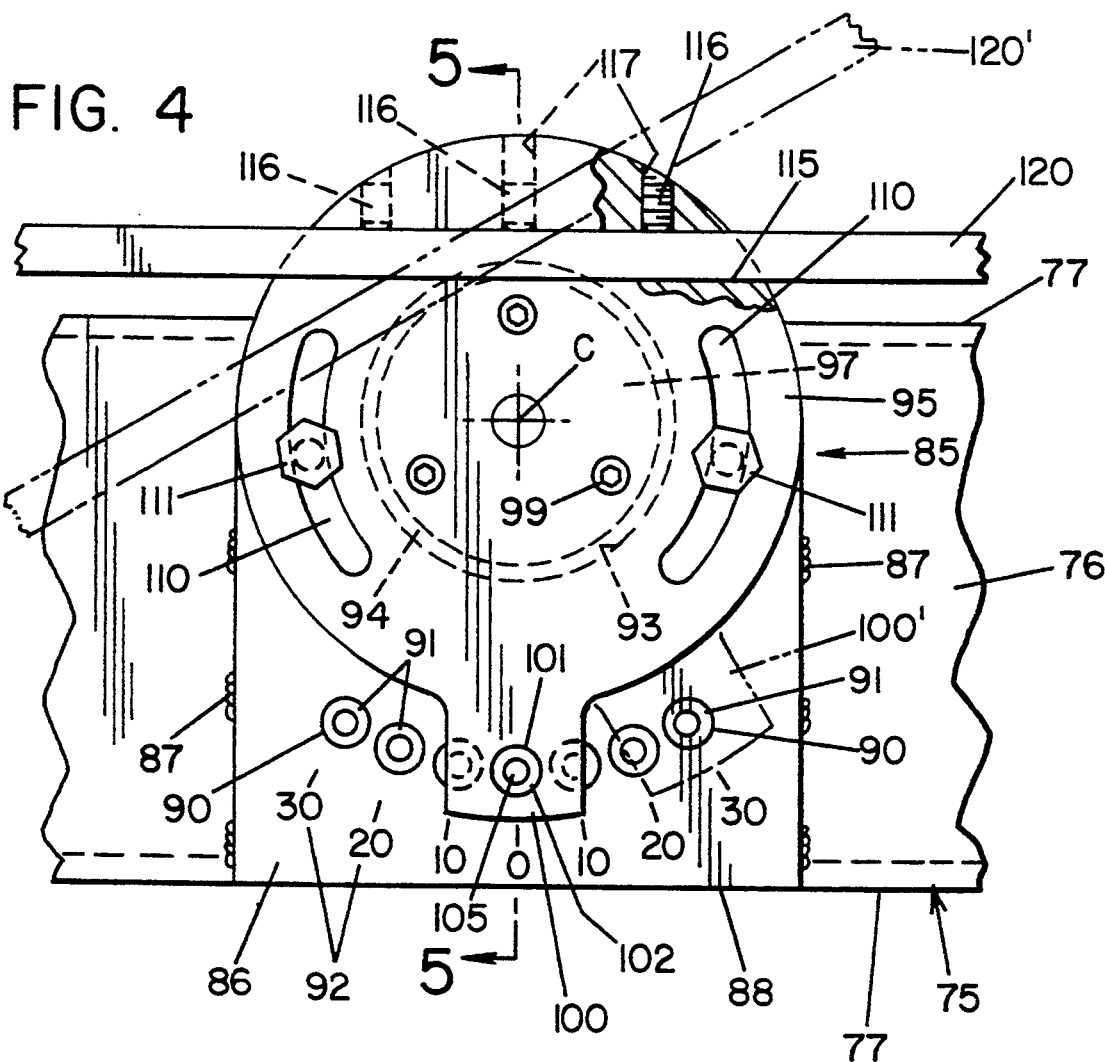
FIG. 4 is an enlarged fragmentary view of the calibration apparatus as viewed in FIG. 3 showing the calibration bar and the angle adjusting mechanism therefor.
Figure 5:
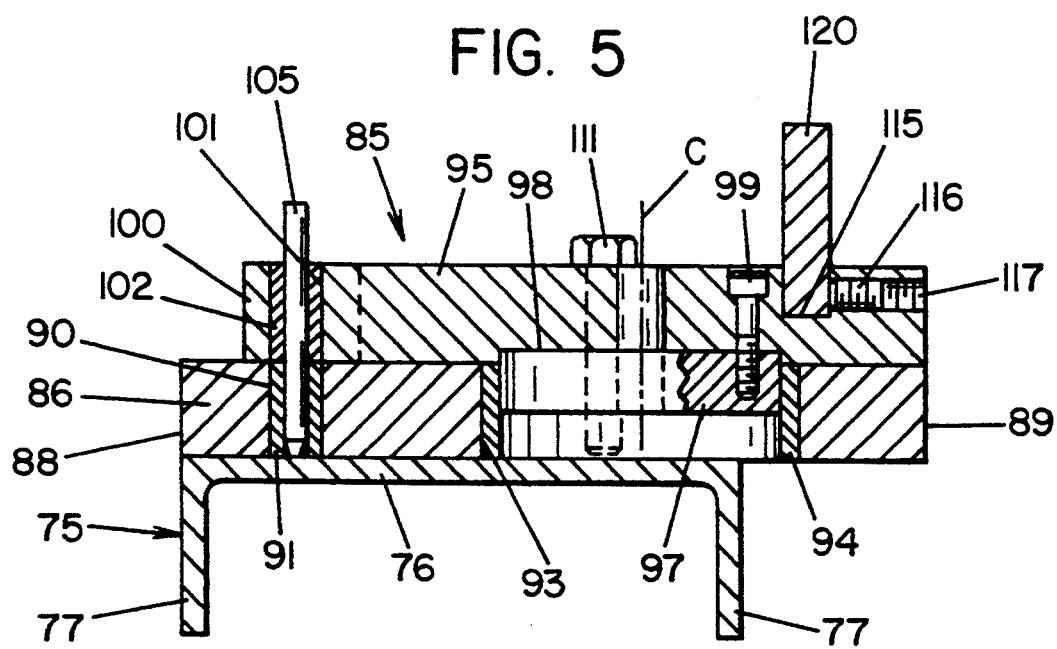
FIG. 5 is a cross-sectional view through the angle adjusting mechanism of the calibration apparatus taken substantially along the line 5—5 of FIG. 4.

The calibration bar positioning assembly 85 has a movable platform 95 which operatively interrelates with the fixed base 86. In particular, the movable platform 95 has a downwardly extending steel plug 97 which is retained in an inset bore 98 in the underside of movable platform 95, as best seen in FIG. 5. The plug 97 is retained in bore 98 as by fasteners 99, such as the machine screws 99 which extend through the movable platform 95 (FIGS. 4 and 5). The steel plug 97 is preferably of a hardened steel which is precisely machined to accurately peripherally engage the interior surface of the steel bushing 94 of fixed base 86. In this manner, the movable platform 95 rotates relative to the fixed base 86 about the centerline C.

The movable platform 95 may be substantially circular in configuration and have the same diameter as the semicircular extremity 89 of fixed base 86 and centered about the center of bore 98, which coincides with the center C of semicircular extremity 89 of fixed base 86. The movable platform 95 may have a radial projection 100 which has a bore 101 spaced the same distance from the center C as the bushings 91 of fixed base 86. The bore 101 has a hardened bushing 102 which is comparable to the bushings 91 of bore 90 of the fixed base 86. It will thus be readily appreciated by persons skilled in the art that movable platform 95 may be rotated relative to fixed base 86 to bring bushing 102 into precise axial alignment with each of the bushings 91 of the fixed base 86 to effect a desired angle adjustment. Such positioning may be temporarily accurately maintained by insertion of a pin 105 through bushing 102 and through a selected one of the bushings 91.

If desired, the movable platform 95 may be provided with one or more arcuate slots 110 through which machine screws 111 extend to additionally supportingly position and guide rotation of the movable platform 95 relative to the fixed base 86.

The movable platform 95 of calibration bar positioning assembly 85 has an elongate slot 115 for seating a precision calibration bar 120. The slot 115 is essentially a chord of the substantially circular configuration of the movable platform 95. The slot 115 is positioned so that it is perpendicular to a line defined by the center C and the center of bushing 102 of movable platform 95. It will thus be appreciated that the bushing 91 proximate the 0° indicating indicia relates to the center C in a direction directly transverse of cross beam 75. Aligning the bushing 102 with bushing 91 and inserting pin 105 therethrough will position the calibration bar 120 in exact parallelism with the cross beam 75 in the solid line depiction of FIG. 4 of the drawings. The calibration bar 120 is also shown in chain lines in FIG. 4 at a position 120' with the radial projection 100 rotated to the 100' chain line position which, for exemplary purposes, depicts a 30° angle of the calibration bar 120 with respect to the cross beam 75, with bushing 102 aligned with bushing 91 opposite the 30° indicating indicia. It is to be appreciated that any angular spacing of the bushings 91 may be employed and that the associated indicating indicia can be modified to reflect any angular spacing and any desired type of angular designations.

The calibration bar 120 is rigidly positioned and retained in the slot 115 by set screws 116 positioned in tapped bores 117 in the circumferential edge of the movable platform 95. Referring now to FIG. 3 of the drawings, it is to be noted that the beam mounting assemblies 42 are located to one side of trunion bases 27 and 28, such that the calibration bar positioning assembly 85 locates the calibration bar 120 in proximity to be spaced a distance from the spindle 37 of the machine assembly 11.

Referring now to FIGS. 2 and 3 of the drawings, the spindle 37 is shown having an adaptor plate 125 mounted thereon. The adaptor plate 125 has a tapped bore 126 which receives an indicator mounting rod 127 that extends a distance radially outwardly of adaptor plate 125 and which is parallel to the plane established by the face of spindle 37 to which a wheel carrying a tire are mounted for test operations on the machine 11. The outer end of the rod 127 mounts or otherwise has attached thereto a conventional dial indicator 130 having a plunger 131. It will be readily appreciated by persons skilled in the art that deviation between parallelism of the adaptor plate 125 and thus the face of spindle 37 relative to any positioning of the calibration bar 120 can be readily determined by comparing the reading of dial indicator 130 at the solid line position depicted in FIG. 3 and the reading when the spindle 37 is rotated through an arc A of approximately 180° (FIG. 2) to the chain line position 130' depicted in FIG. 3. It will be appreciated that the indicator mounting rod 127 and indicator 130 could be mounted directly on the spindle 37 by providing a bore comparable to bore 126 therein. Thus, in the context of the instant application, spindle shall mean either spindle 37 with a bore for the indicator mounting rod 127 or the spindle with adaptor plate 125 having bore 126 for receiving the indicator mounting rod 127.

In initially setting up for use of the calibration fixture 40, the conventional calibration fixture supplied with machine assembly 11 which attaches to the belt 21 is employed as described hereinabove. With the conventional calibration equipment, average spindle angle at zero spindle angle command from the control system to the machine assembly 11 is determined. Based upon this average, the indicator reading for a true slip angle of 0° is computed. Then, the calibration fixture 40 is installed on the machine assembly 11 as described hereinabove. The calibration fixture 40 is then positionally adjusted so that the 0° position of the calibration fixture 40, when positioned as depicted in FIG. 2, gives the computed indicator readings previously determined. This position of the calibration fixture 40 is now defined as a slip angle of 0°. The machine screws 60 and 61 are then locked by nuts 62 and 63 to establish the position of the alignment block 50 laterally of the beam mounting assemblies 42. The machine screws 78 are also tightened with the relative position of cross beam 75 and the beam end support 70 established. It will be appreciated that the cross beam 75 and elements carried thereby may be readily positioned and removed from the machine assembly 11 merely by placing the bores 71 of end support 70 over the pin 65 of the alignment block 50. Future calibration of slip angle can be made employing merely the calibration fixture 40 for verifying or calibration of slip angle through the range of angles in the operating range of the machine 11 as hereinabove described.

Thus it should be evident that the calibration apparatus for tire test system disclosed herein carries out the various objects of the invention set forth hereinabove and otherwise constitutes an advantageous contribution to the art. As may be apparent to persons skilled in the art, modifications can be made to the preferred embodiment disclosed herein without departing from the spirit of the invention, the scope of the invention being limited solely by the scope of the attached claims.

We claim:

1. Calibration apparatus for a tire testing machine having an A-shaped framework formed by diverging trunions with a spindle having a face seating a wheel for mounting a test tire movably supported between the trunions comprising, a pair of beam mounting means affixed in spaced relation on the A-shaped framework, cross beam means supported by said pair of beam mounting means, calibration bar positioning means on said cross beam means supporting a calibration bar in spaced relation to the face of the spindle, angle adjusting means on said calibration bar positioning means for selectively angularly orienting said calibration bar relative to said cross beam means, an indicator mounting rod means extending from the spindle in a direction paralleling the face of the spindle, dial indicator means extending from said indicator mounting rod for engaging said calibration bar means at spaced locations upon rotation of the spindle through approximately 180° to establish parallelism of the face of the spindle and said calibration bar at selected angular settings of the spindle and said calibration bar.

2. Calibration apparatus according to claim 1, wherein said beam mounting means includes upstanding alignment pins and beam end supports attached to said cross beam means and having bores for engaging said alignment pins, whereby said cross beam means may be quickly and precisely positioned in relation to the framework of the machine and removed therefrom.

3. Calibration apparatus according to claim 2, wherein said cross beam means may be adjustably longitudinally positioned relative to each of said beam end supports.

4. Calibration apparatus according to claim 3, wherein said cross beam means has longitudinal slots and fasteners extending through said slots threadably engaging tapped bores in said beam end supports.

5. Calibration apparatus according to claim 2, wherein said beam mounting means have alignment blocks mounting said alignment pins.

6. Calibration apparatus according to claim 5, wherein said beam mounting means includes plates affixed to the framework having means for adjustably moving and retaining said alignment blocks.

7. Calibration apparatus according to claim 1, wherein said cross beam means is a channel beam having a web supporting said calibration bar positioning means substantially medially thereof and having side flanges extending from said web.

8. Calibration apparatus according to claim 1, wherein said calibration bar positioning means has a movable platform which supports said calibration bar.

9. Calibration apparatus according to claim 8, wherein said movable platform has an elongate slot for receiving said calibration bar and means for retaining said calibration bar in said slot.

10. Calibration apparatus according to claim 8, wherein said calibration bar positioning means includes a fixed base attached to said cross beam means and operatively interrelated with said movable platform.

11. Calibration apparatus according to claim 10, wherein said fixed base has a bore with a bushing therein and said movable platform has an extending plug which precisely interfits with said bushing.

12. Calibration apparatus according to claim 10, wherein said angle setting means includes a plurality of angularly spaced bores in said fixed base located on an arc centered on the rotational axis of said movable platform and has bushings in said bores.

13. Calibration apparatus according to claim 12, wherein said movable platform has a bore positioned the distance from the rotational axis of said movable platform as said spaced bores and having a bushing therein.

14. Calibration apparatus according to claim 13, wherein said angle setting means includes a pin insertable in said bushing of said movable platform and a selected one of said bushings in said fixed base for positioning said calibration bar at a predetermined angular position relative to said cross beam means.

15. Calibration apparatus according to claim 1, wherein said dial indicator means extends in a direction perpendicular to said indicator mounting rod means.

* * * * *